United States Patent [19]
Watanabe et al.

[11] Patent Number: 6,045,867
[45] Date of Patent: *Apr. 4, 2000

[54] FLUORINE COMPOUND—CONTAINING COMPOSITE MATERIAL AND METHOD FOR PREPARING SAME

[75] Inventors: Nobuatsu Watanabe, Nagaokakyo; Yong-Bo Chong, Kyoto; Sowjun Matsumura, Toyonaka, all of Japan

[73] Assignees: Nobatsu Watanabe; Yong-Bo Chong, both of Kyoto; C. Uyemura & Co., Ltd., Osaka, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/789,067
[22] Filed: Jan. 27, 1997

Related U.S. Application Data

[60] Continuation of application No. 08/457,474, Jun. 1, 1995, abandoned, which is a division of application No. 08/051,701, Apr. 23, 1993, Pat. No. 5,589,271, which is a continuation-in-part of application No. 07/850,427, Mar. 12, 1992, abandoned.

[30] Foreign Application Priority Data

Mar. 12, 1991 [JP] Japan ....................... 3-72444
Mar. 12, 1991 [JP] Japan ....................... 3-72445

[51] Int. Cl.$^7$ ........................................... B05D 3/02
[52] U.S. Cl. ............................. 427/377; 427/437
[58] Field of Search .................... 427/377, 437

[56] References Cited

U.S. PATENT DOCUMENTS

| | | | |
|---|---|---|---|
| 2,933,536 | 4/1960 | Wall et al. | 260/653.1 |
| 3,154,506 | 10/1964 | Janssens | 260/17 |
| 3,293,203 | 12/1966 | Paulus | 260/37 |
| 3,361,679 | 1/1968 | Paulus | 252/305 |
| 3,864,124 | 2/1975 | Breton et al. | 75/212 |
| 4,042,747 | 8/1977 | Breton et al. | 428/323 |
| 4,264,750 | 4/1981 | Anand et al. | 525/356 |
| 4,908,415 | 3/1990 | Aramaki et al. | 525/356 |
| 4,990,544 | 2/1991 | Asaumi et al. | 521/145 |

FOREIGN PATENT DOCUMENTS

| | | | |
|---|---|---|---|
| A0403834 | 12/1990 | European Pat. Off. | C25D 15/02 |
| A1035566 | 7/1966 | United Kingdom | C08F 29/16 |

*Primary Examiner*—Benjamin Utech
*Attorney, Agent, or Firm*—Sughrue, Mion, Zinn Macpeak & Seas, PLLC

[57] ABSTRACT

A fluorine compound-containing composite material consists essentially of a metal or polymer matrix and particles or fibers of a polytetrafluoroethylene oligomer having a number average molecular weight of 10,000 or less, the proportion of the number of fluorine atoms to the number of the total atoms at the surface portion of the composite material being 40% or more.

8 Claims, 4 Drawing Sheets

FLUORINE COMPOUND— CONTAINING COMPOSITE MATERIAL AND METHOD FOR PREPARING SAME

CROSS REFERENCE TO RELATED APPLICATION

This is a Continuation of application Ser. No. 08/457,474 filed Jun. 1, 1995 now abandoned, which is a Divisional of application Ser. No. 08/051,701 filed Apr. 23, 1993, now U.S. Pat. No. 5,589,271, which is a Continuation-in-Part of application Ser. No. 07/850,427 filed Mar. 12, 1992 (now abandoned).

The present invention relates to a fluorine compound-containing composite material having a remarkably outstanding water and oil repellency and lubricity, and a method of preparing the same.

BACKGROUND OF THE INVENTION

Fluorine compound-containing composite materials are conventionally manufactured by dispersing particles or fibers of a fluorine compound into a metal or polymer matrix,. For a fluorine compound-metal composite material, it is known that by using a composite plating bath prepared by dispersing particles or fibers of a fluorine compound such as fluoro resin (e.g., polytetrafluoroethylene resin) and fluorinated graphite $(CF)_n$ into a metal plating solution such as nickel plating solution and codepositing a metal film with the particles or fibers from the composite plating bath, a composite plating film having particles or fibers of fluoro resin or fluorinated graphite in a metal matrix can be obtained and the resulting composite plating film has an excellent water repellency and lubricity.

A fluorine compound-polymer composite material is prepared by dispersing the fluoro resin or fluorinated graphite into a polymer such as epoxy resin. Such a fluorine compound-polymer composite material also has an excellent water repellency and lubricity.

However, the contact angle of the composite material having the conventional polytetrafluoroethylene resin particles dispersed therein is about 105° and the contact angle of the composite material having fluorinated graphite particles dispersed therein is 120°. There is a demand for composite materials having a higher contact angle and hence a more excellent water and oil repellency and lubricity.

SUMMARY OF THE INVENTION

Therefore, an object of the present invention is to provide a fluorine compound-containing composite material having a remarkably outstanding water and oil repellency and lubricity.

Another object of the present invention is to provide a method of preparing such a fluorine compound-containing composite material.

The present inventors have found that by using a composite plating bath prepared by dispersing polytetrafluoroethylene oligomer particles having a number average molecular weight of 10,000 or less in a metal plating solution, a composite film consisting essentially of a metal matrix and the polytetrafluoroethylene oligomer particles having a number average molecular weight of 10,000 or less dispersed therein can be obtained and, surprisingly, the thus obtained composite film has a contact angle of 150° or more and hence a remarkably outstanding water and oil repellency and lubricity. We have further found that by contacting fluorine gas to the surface of the composite film obtained, the contact angle thereof is further increased.

As described above, the conventional composite material having polytetrafluoroethylene resin particles dispersed therein has a contact angle of about 105°. The dispersed amount of polytetrafluoroethylene resin particles in the composite material is usually in a range of 20 to 40% by volume. If the dispersed amount of polytetrafluoroethylene resin particles is increased, the contact angle may be increased to some extent. However, even if the dispersed amount can be increased nearly to 100% by volume, the contact angle is no longer increased and the water repellency is not improved any more. This is recognized from the fact that polytetrafluoroethylene resin film formed on the entire surface of an article as so-called "Teflon" coating merely has a contact angle of about 110°.

As the result of investigating about various fluorine compound-containing composite materials, the inventors have found that the proportion of the number of fluorine atoms to the number of the total atoms at the surface portion of the composite material has an important relation to the contact angle or repellency at the surface. More specifically, the conventional polytetrafluoroethylene resin has a number average molecular weight of 100,000 or more and substantially consists of $CF_2$ groups although the end groups are composed of $CF_3$ groups. Therefore, even if the dispersed amount of such polytetrafluoroethylene resin in a composite material is increased, the proportion of the number of fluorine atoms at the surface portion of the composite material is not so increased and therefore the contact angle or repellency is not so highly improved. The proportion of the number of fluorine atoms at the surface portion is about 15% by volume at most even if the surface portion is formed only by the polytetrafluoroethylene resin having a number average molecular weight of 100,000 or more.

On the other hand, when a composite material is prepared by using polytetrafluoroethylene oligomer particles having a number average molecular weight of 10,000 or less or fluorinated ones prepared by treating the polytetrafluoroethylene oligomer particles with fluorine gas, the proportion of the number of fluorine atoms at the surface portion of the composite material is extremely increased and the contact angle or repellency thereof is surprisingly increased. We have further investigated and reached to a new finding that it is important to increase the proportion of the number of fluorine atoms at the surface portion in order to attain an increased contact angle resulting in a higher repellency and that when the proportion of the number of fluorine atoms at the surface portion of the composite material is increased to 40% or more, water repellency is remarkable and, to our surprise, a contact angle of nearly 180° can be attained in fact.

Therefore, according to one aspect of the present invention, there is provided a fluorine compound-containing composite material having a contact angle of 150° or more at the surface consisting essentially of a matrix and particles or fibers of a polytetrafluoroethylene oligomer having a number average molecular weight of 10000 or less dispersed therein, the proportion of the number of fluorine atoms to the number of the total atoms at the surface portion of the composite material being 40% or more.

According to another aspect of the present invention, there is provided a method of preparing a fluorine compound-containing composite material comprising codepositing a metal film with particles or fibers of a fluorine compound to an article to be plated from a composite plating bath having said particles or fibers dispersed therein so that a composite plating film consisting essentially of a metal matrix and the particles or fibers dispersed therein is formed on the article and the proportion of the number of fluorine atoms to the number of the total atoms at the surface portion of the composite plating film is 40% or more.

There is also provided a method of preparing a fluorine compound-containing composite material comprising codepositing a metal film with polytetrafluoroethylene oligomer particles having a number average molecular weight of 10,000 or less to an article to be plated from a composite plating bath having said particles dispersed therein, thereby forming a composite plating film having said particles dispersed in a metal matrix on said article.

DETAILED DESCRIPTION OF THE INVENTION

Figure 1:
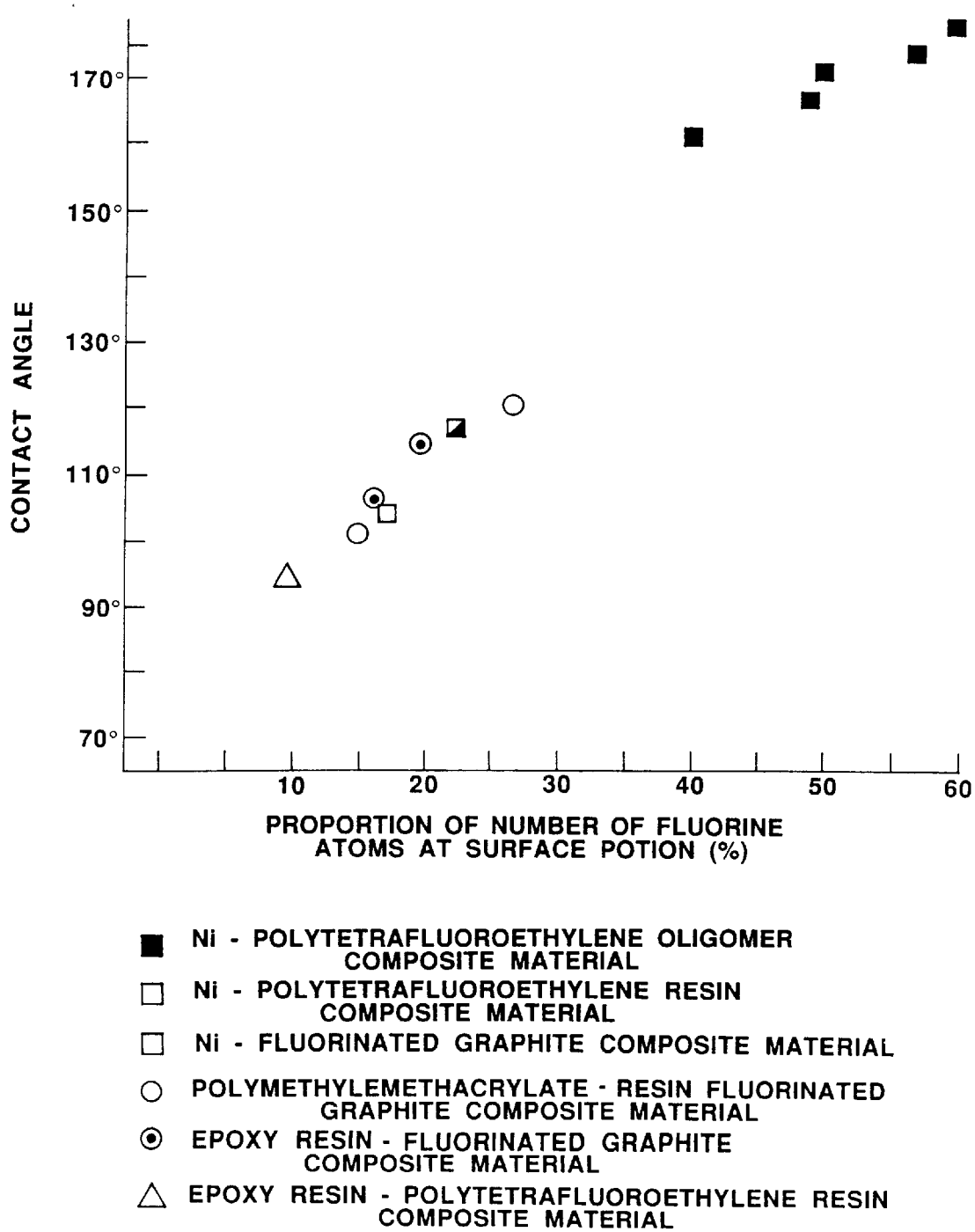
FIG. 1 is a graph showing a relationship between the proportion of the number of fluorine atoms at the surface portion of a composite material and a contact angle.

The fluorine compound-containing composite material according to the present invention comprises a matrix composed of metal, polymer or the like and particles or fibers of a fluorine compound or a modified fluorine compound surface treated with fluorine gas dispersed therein. At the surface portion (about 20 to about 40 Å thick) of the composite material, the proportion of the number of fluorine atoms to the number of the total atoms is in a range of 40% or more, preferably 40 to 60%. The composite material has a contact angle of 150° or more, preferably 160° or more, more preferably 170° to 180°. If the proportion of the number of fluorine atoms is less than 40% at the surface portion, such a high contact angle cannot be achieved.

The matrix material is not restricted and various materials can be used as a matrix. For example, metals including nickel, nickel alloys, copper, copper alloys, zinc, zinc alloys, tin, tin alloys and precious metals such as silver and silver alloys and polymers including epoxy resins, acrylic resins, metacrylic resins, polyolefins such as polyethylenes and natural and synthetic rubbers can be used.

The fluorine compound to be dispersed in the matrix should preferably be one in which the proportion of $CF_3$ group is high. The preferred fluorine compound is a polytetrafluoroethylene oligomer having a number average molecular weight of 10,000 or less because of a high proportion of $CF_3$ group. The lower limit of the molecular weight of the oligomer is not restricted because the proportion of $CF_3$ group increases as the molecular weight becomes lower, although the lower limit may be 1,000 in general. The polytetrafluoroethylene oligomer has a lot of end groups composed of $CF_3$ groups as compared with the conventional polytetrafluoroethylene resin having a number average molecular weight of 100,000 or more and, therefore, contains more $CF_3$ groups. Accordingly, the polytetrafluoroethylene oligomer having so many $CF_3$ groups can give a composite material having a higher proportion of the number of fluorine atoms. The polytetrafluoroethylene oligomer should preferably have an average particle size of 0.1 to 150 $\mu$m, preferably 0.1 to 15 $\mu$m, more preferably 0.1 to 4 $\mu$m. The use of fine particles is preferred in order to increase the proportion of the number of fluorine atoms at the surface portion.

The conventional high-molecular-weight polytetrafluoroethylene resin having a number average molecular weight of 100,000 or more substantially consists of $CF_2$ group. The conventional fluorinated carbon—$(CF)_n$—substantially consists of CF group. The proportion of $CF_3$ in the conventional polytetrafluoroethylene resin and fluorinated graphite is extremely low. Thus they cannot give composite materials having the proportion of the number of fluorine atoms of 40% or more at the surface portion, as described above. However, the conventional polytetrafluoroethylene resin and fluorinated graphite modified by treating them with fluorine gas to introduce $CF_3$ groups thereto and increase the content of $CF_3$ groups can also preferably be used as a fluorine compound to be dispersed in a matrix. Of course, the modified polytetrafluoroethylene oligomer treated with fluorine gas is also preferably used.

The dispersed amount of the fluorine compound to a matrix is not limited so long as the fluorine compound is present so that the composite material contains the proportion of the number of fluorine atoms of 40% or more at its surface portion.

The composite material having a metal matrix and particles or fibers of a fluorine compound dispersed therein according to the present invention can be obtained by an electrodeposition or electroless deposition method in which a composite plating bath prepared by dispersing particles or fibers of a fluorine compound containing many $CF_3$ groups such as polytetrafluoroethylene oligomer having a number average molecular weight of 10,000 or less into a metal plating solution is used.

The metal plating solution in which the particles or fibers of the water-insoluble fluorine compound are dispersed may be the ordinary one used for the conventional composite plating. Examples of the plating solutions include nickel plating solutions such as Watt's bath and nickel sulfamate bath, nickel alloy plating solutions, copper plating solutions such as copper sulfate bath, copper alloy plating solutions, tin plating solutions, tin alloy plating solutions, zinc plating solutions, zinc alloy plating solutions and precious metal plating solutions such as silver plating solutions and silver alloy plating solution. The metal plating solution is either an electroplating solution or an electroless plating solution and comprises the conventional components according to the prior art formulation.

The particles or fibers of the fluorine compound such as the polytetrafluoroethylene oligomer having a number average molecular weight of 10,000 or less are dispersed in the metal plating solution in an amount of about 1 to about 300 grams, preferably about 10 to about 100 grams, more preferably about 50 to about 80 grams per 1 liter of the metal plating solution.

The composite plating bath prepared by dispersing the particles or fibers of the water-insoluble fluorine compound, typically the polytetrafluoroethylene oligomer, into the metal plating solution may contain a surface active agent in order to disperse the particles or fibers more uniformly in the bath and increase the codeposition rate of the particles or fibers in the metal plating film. As the surface active agents, perfluoroalkyl type surface active agents can preferably be used singly or in combination of two or more, cationic perfluoroalkyl ammonium salts being most preferred. The amount of the surface active agent is about 0.001 to about 10 grams, preferably about 0.1 to about 3 grams, more preferably about 0.5 to about 0.8 grams per 1 liter of the bath.

The plating conditions may be substantially the same plating conditions as in the conventional metal plating. In this case, the bath should be sufficiently agitated in order to uniformly disperse the particles or fibers in non-agglomerated state or separately into individual pieces thereby obtaining a metal plating film in which the particles or fibers are codeposited with a larger amount and in a uniformly and individually dispersed state. From this point of view, agitation by ultrasonic wave is recommended.

The codeposited or dispersed amount of the particles or fibers in the plating film should preferably be in a range of about 2 to about 50% by volume, more preferably about 10 to about 30% by volume.

The composite plating film is formed on an article to be plated. The article is not restricted so long as it can be plated. In other words, the article should have a electrically conductive surface. For example, the article is made of either metal or nonconductive material such as plastics and ceramics having a metal or other conductive layer formed thereon.

A fluorine compound-containing composite material can also be prepared by effect a composite plating film consisting essentially of a metal matrix and particles or fibers of a fluorine compound codeposited and dispersed therein to a fluorinating treatment.

The fluorinating treatment is carried out by providing and contacting fluorine gas to the surface of the composite plating film. In case that the fluorinating treatment is effected to the composite plating film having the above-said polytetrafluoroethylene oligomer dispersed therein, the proportion of the number of fluorine atoms in the composite plating film more increases at the surface portion, resulting in further improved surface characteristics including water repellency.

If the composite plating film is heat treated, the fluorinating treatment should preferably be carried out after heat treatment. More specifically, when the composite plating film is heat treated in air or in an inert gas atmosphere such as nitrogen, argon and helium, particularly in air, the proportion of the number of fluorine atoms in the composite plating film may be decreased at the surface portion because a part of fluorine atoms present at the surface portion are replaced by oxygen atoms, causing the decrease of the contact angle. The fluorinating treatment can replace the oxygen atoms introduced upon heat treatment by fluorine atoms and further increase fluorine atoms at the surface portion of the composite plating film thereby increasing the proportion of the number of fluorine atoms.

The composite material consisting essentially of a polymer matrix and particles or fibers of a fluorine compound, typically the polytetrafluoroethylene oligomer, may be prepared by adding and dispersing the particles or fibers into a monomer and then polymerizing the monomer dispersing the particles or fibers therein.

The fluorine compound-containing composite material according to the present invention has a remarkably outstanding water and oil repellency and lubricity, and therefore can be available for various uses requiring these properties.

Examples and Comparative Examples are shown below for illustration but not for limitation.

[EXAMPLE]

Using a composite electroplating bath having the following formulation, a test piece having 30 mm long, 30 mm wide and 0.1 mm thick was electroplated by the following plating condition.

Composition of plating bath and plating condition

| | |
|---|---|
| Nickel sulfamate | 350 g/l |
| Nickel chloride | 45 g/l |
| Boric acid | 40 g/l |
| Surface active agent (*1) | 0.5 g/l |
| Polytetrafluoroethylene oligomer particle (*2) | 50–70 g/l |
| pH of the plating bath | 3.7 |
| Cathode current density | 5 A/dm$^2$ |
| Anode | Nickel |
| Temperature | 43° C. |
| Agitation | Ultrasonic wave |
| Plating time | 10 minutes |
| Film thickness | 10 μm |

(*1) "Megafak" F-150, a product of Dai-Nippon Ink Chemical Co., Ltd.
(*2) Molecular weight 8,000 to 10,000 (number average)
Average particle size 4 μm (a product of Central Glass Co., Ltd.)

To the resulting fluorine compound-containing composite materials (composite plating films), the proportion of the number of fluorine atoms at the surface portion and the contact angle were measured by the following methods.

The results are shown in Table 1. The codeposited amount of the polytetrafluoroethylene oligomer was also shown in Table 1. Method of measuring the proportion of the number of fluorine atoms at the surface portion of the composite material The measurement of the proportion of the number of fluorine atoms to the number of the total atoms at the surface portion was conducted by a photoelectron spectrophotometry using an X-ray photoelectron spectrophotometer ESCA-750 manufactured by Shimazu Seisakusho, Ltd. and irradiating Mg—K$_\alpha$ (125306 eV) as an X-ray source. The correction of bond energy was made based on gold 4f3/2 spectrum (83.6 eV) as the reference standard. For the quantitative analysis, the spectra of the respective atoms were measured.

In case of the composite materials comprising a polymer matrix described Later in which hydrogen atoms are contained, the hydrogen atoms cannot be measured by ESCA 750. So the H/O in the monomer was calculated and then the number of hydrogen atoms was calculated from the spectral intensity of oxygen atoms.

Method of measuring contact angle

Contact angle was measured at room temperature (25° C.) using a contact angle measurement apparatus G-I manufactured by Etsuma Co., Ltd. The measurement was carried out by dropping a droplet of distilled water the diameter of which was adjusted to 1 mm through a microhead from a microsyringe to the surface of a composite material sample and then quickly reading the equilibrated contact angle. The contact angle value shows the mean value of 10 samples.

TABLE 1

| Sample No. | Proportion of the number of fluorine atoms at the surface portion (%) | Contact angle | Codeposited amount of the oligomer (% by volume) |
|---|---|---|---|
| 1 | 56 | 173° | 30 |
| 2 | 40 | 160° | 25 |

TABLE 1-continued

| Sample No. | Proportion of the number of fluorine atoms at the surface portion (%) | Contact angle | Codeposited amount of the oligomer (% by volume) |
|---|---|---|---|
| 3 | 52 | 170° | 28 |
| 4* | 48 | 165° | 30 |
| 5** | 58 | 179° | 30 |

*Sample obtained by heat treating Sample No. 1 at 320° C. for 5 hours in air.
**Sample obtained by contacting fluorine gas to the surface of Sample 4 for 2 hours at a fluorine pressure of 760 mmHg.

[COMPARATIVE EXAMPLE]

The above composite plating process of Example was repeated except polytetrafluoroethylene resin particles having a number average molecular weight of more than 100,000 were used instead of the polytetrafluoroethylene oligomer particles. In the resulting composite plating film, the proportion of the number of fluorine atoms at the surface portion of the film was 16%, the codeposited amount of the polytetrafluoroethylene resin particles in the film was 30% by volume and the contact angle was 105°.

Further, for comparison purposes, the proportions of the number of fluorine atoms at the surface portion as well as contact angle were evaluated for a nickel-fluorinated graphite composite material obtained by the same procedure as in Example except that fluorinated graphite particles were used instead of the oligomer particles, a composite material consisting of polymethylmethacrylate resin matrix and fluorinated graphite particles dispersed therein, and composite materials consisting of epoxy resin matrix and fluorinated graphite particles or polytetrafluoroethylene resin particles having a number average molecular weight of more than 100,000 dispersed therein.

The results are shown in FIG. 1.

As is evident from the results of FIG. 1 which shows the relation between the proportion of the number of fluorine atoms at the surface portion and the contact angle, the composite materials have higher contact angles if the proportion of the number of fluorine atoms at the surface portion is 40% or more.

Figure 2:
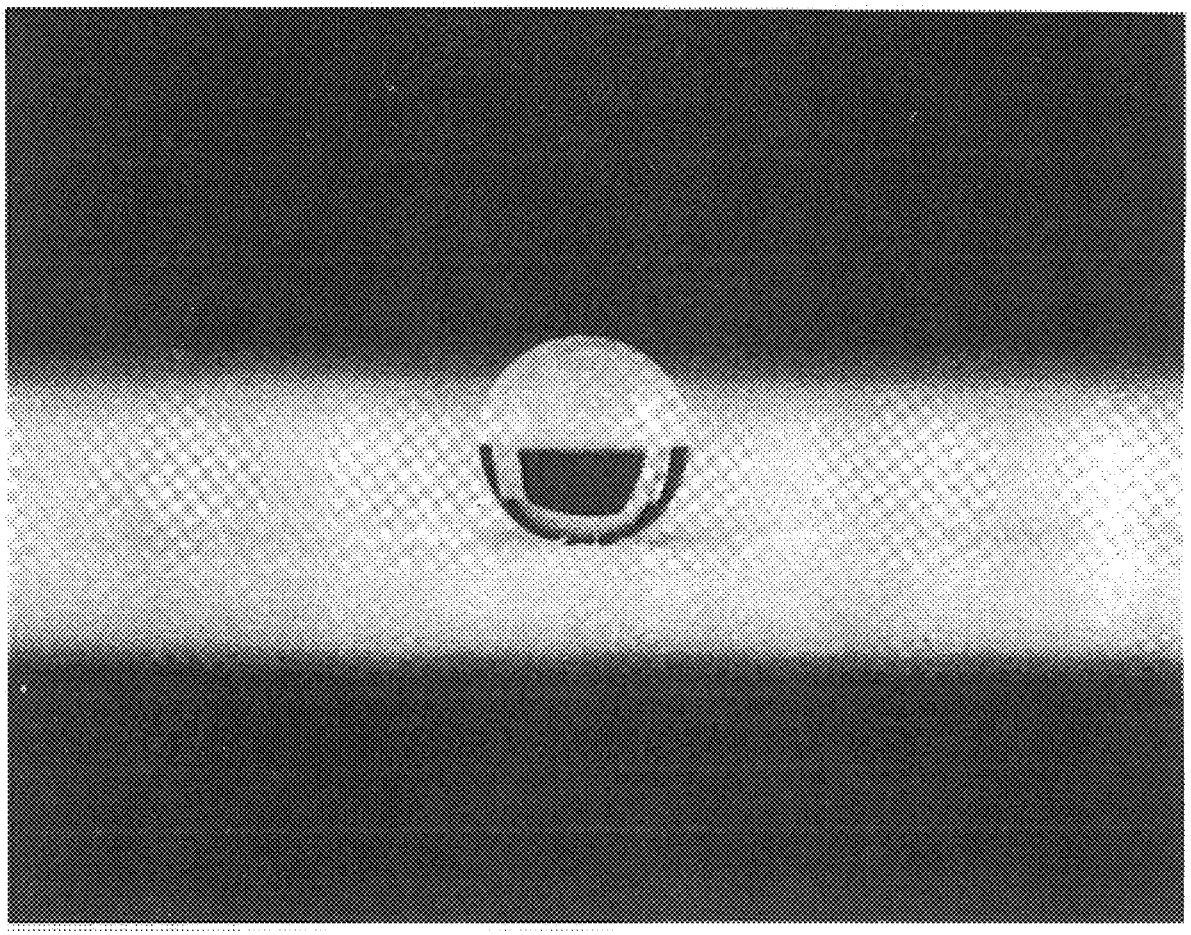
FIG. 2 is a microscopic photograph showing the contact state of a water droplet on a nickel-polytetrafluoroethylene oligomer composite material according to the present invention.
Figure 3:
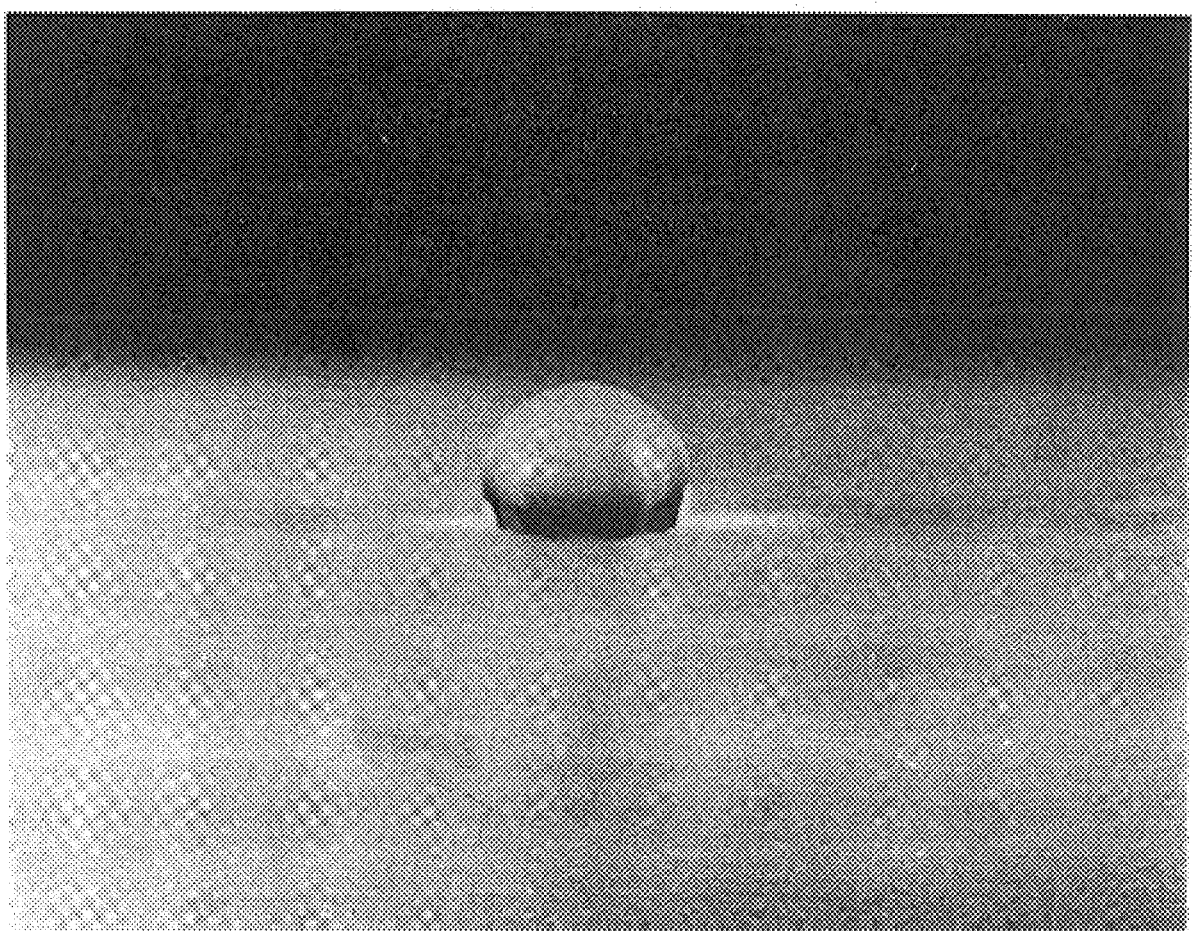
FIG. 3 is a microscopic photograph showing the contact state of a water droplet on the conventional polytetrafluoroethylene resin film.
Figure 4:
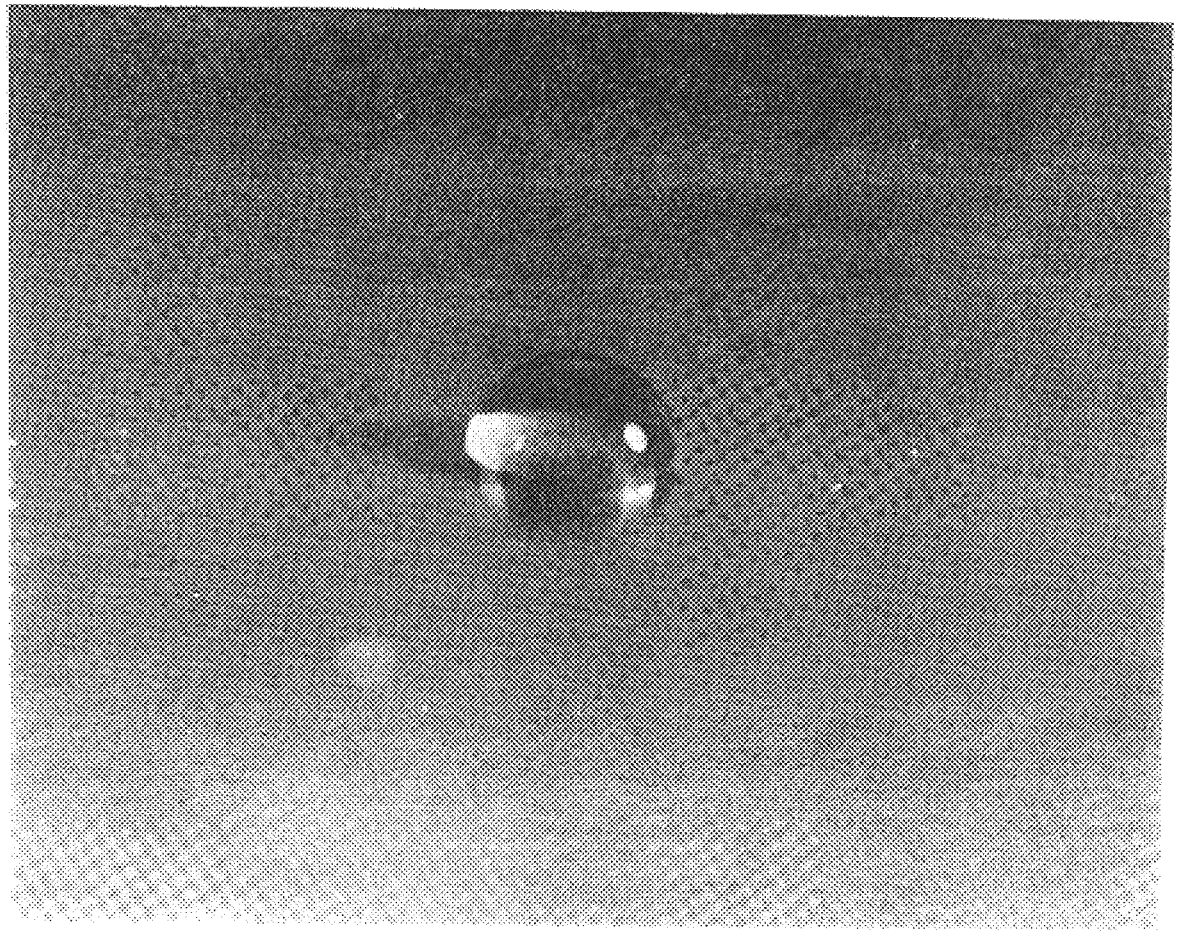
FIG. 4 is a microscopic photograph showing the contact state of a water droplet on the conventional nickel plating film.

FIGS. 2 to 4 are microscopic photographs (magnification: 20 times). FIG. 2 shows the contact state of a water droplet on the surface of a nickel-polytetrafluoroethylene oligomer composite material having a contact angle of 173° according to the present invention. FIG. 3 shows the contact state of a water droplet on the surface of the conventional polytetrafluoroethylene resin film having a number average molecular weight of more than 100,000 and a contact angle of 110°. FIG. 4 shows the contact state of a water droplet on the surface of the conventional nickel plating film having no fluorine compound dispersed therein and a contact angle of 67°.

We claim:

1. A method of preparing a fluorine compound-containing composite material, which method comprises codepositing a metal film with polytetrafluoroethylene oligomer particles having a number average molecular weight of 10,000 or less onto an article to be plated, thereby obtaining a codeposited plating film consisting essentially of said particles dispersed in a metal matrix on said article, the proportion of the number of fluorine atoms to the number of the total atoms at the surface of the composite plating film being 40% or more, said codeposited plating film having a contact angle of 150° or more.

2. The method of claim 1 wherein fluorine gas is contacted to the surface of the composite film.

3. The method of claim 1 wherein said surface is about 20 to 40 Å thick.

4. The method of claim 3 wherein the amount of polytetrafluoroethylene oligomer particles in the codeposited plating film is in the range of from about 2 to about 50% by volume.

5. The method of claim 4 wherein said polytetrafluoroethylene oligomer particles have an average particle size of 0.1 to 150 μm.

6. The method of claim 5 wherein said number average molecular weight is from 1,000 to 10,000.

7. The method of claim 6 wherein the proportion of the number of fluorine atoms to the number of the total atoms at the surface of the codeposited plating film is 40 to 60%.

8. The method of claim 7 wherein the codeposited plating film has a contact angle of 170° to 180°.

* * * * *